G. H. DAY.
OPHTHALMIC MOUNTING.
APPLICATION FILED DEC. 27, 1915.
1,224,283.
Patented May 1, 1917.
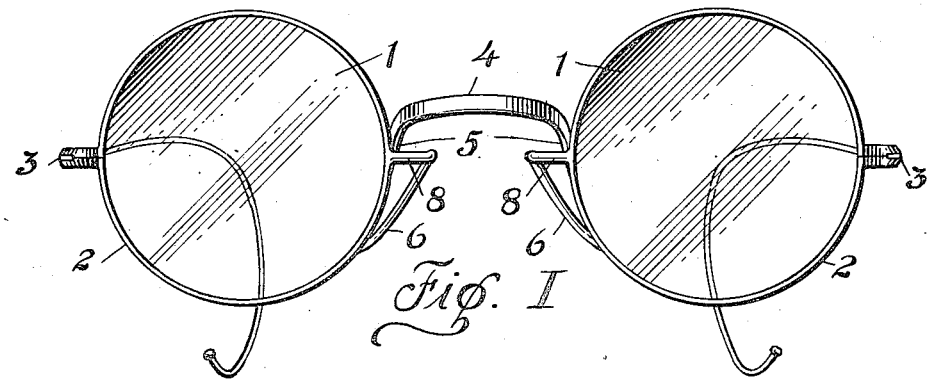
Fig. I
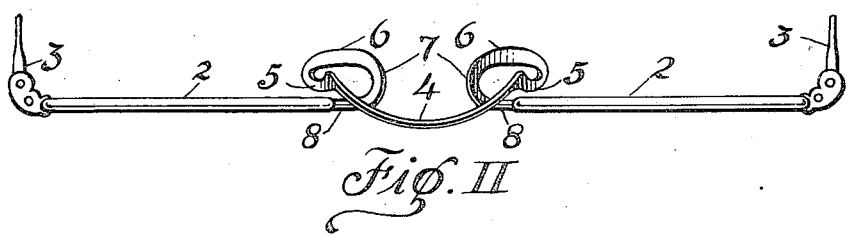
Fig. II
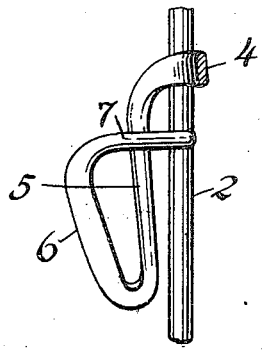
Fig. III
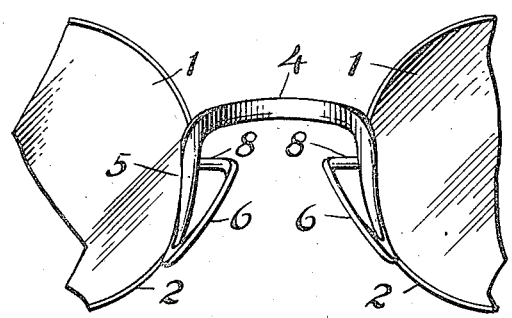
Fig. IV
WITNESSES:
Joseph J. Demers
Edith M. Halvorsen
INVENTOR
George H. Day
BY
H. H. Styll A. K. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,224,283.  Specification of Letters Patent.  Patented May 1, 1917.

Application filed December 27, 1915. Serial No. 68,782.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to a mounting of the spectacle type.

One of the leading objects of the invention is the provision of a neat and attractive construction which shall be provided with novel and improved means for engaging the sides of the nose of the wearer.

A further object of the invention is the provision of an improved manner of connecting the lenses whereby the same may be readily adjusted to comfortably fit various sizes and shapes of noses.

Other objects and advantages of the improved construction should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a front view of a mounting embodying the principles of my improvement.

Fig. II represents a top plan view thereof.

Fig. III represents a section through the bridge with the nose engaging member in elevation.

Fig. IV represents a rear view.

In the drawings, in which similar characters of reference are employed to denote corresponding parts throughout the several views, the numeral 1 designates the lenses which are inclosed in the usual frame 2, bearing at its outer edge the temple or similar device 3 for retaining the mounting in position on the face of the wearer.

To connect the lens retaining frames I employ my combined bridge and bearing pad member comprising the central preferably widened cross bar 4 having the depending ends 5 terminating in the inwardly and upwardly looped nose engaging or bearing members 6 having forwardly extending portions 7 terminating in laterally projecting posts 8 having their outer ends secured to the frame 2.

Among the advantages which might be mentioned for the foregoing construction are the fact that the cross piece 4 may be adjusted either to bear upon or to curve around the nose without touching the same, the portions 5, as is best understood by reference to Fig. I, curve downwardly behind and are practically concealed by the lens frames 2, rendering these parts extremely inconspicuous, while the guards or bearing members 6 are positioned to satisfactorily engage the edge of the nose. Additional advantage resides in the fact that the entire device is made of pliable material, possesses several loops or bends, and in general is so shaped and designed that by grasping with the pliers the parts may be quickly and readily adjusted to fit wide or narrow faces, to throw the lenses up or down and to secure exact correct engagement of the bearing member 6 with the nose. For instance, to make the mounting narrower it is only necessary to bend backward the parts 5 thus causing the lenses to further overlap the bridge portion 4 and members 5, while the lenses may be thrown up or down by adjustment of either the post 4, or the loop joining the portions 5 and 6.

Similarly to widen the mounting the portion 7 connecting the bearing member with the post 8, may be twisted to straighten the angle of the guard, or the bending may be performed at the lower part of the portion 5, as may be desired.

If preferred, in place of forming the mounting from ductile material, relatively resilient or spring material may be employed, in which latter event it is very necessary to grasp the frames 2 and draw the lenses apart to place the mounting in position on the face when it will automatically spring back into correct fitting position.

I claim:

1. A center for an ophthalmic mounting, comprising a central arched member terminating in depending portions, bearing members curving upwardly and inwardly from the lower portions of the depending members and posts carried by the upper portions of the bearing members and extending outwardly for engagement with the lens frame.

2. In an ophthalmic mounting, the combination with a pair of lens frames, a one-piece connecting member therefor comprising posts extending inwardly from the frames, thence rearwardly and downwardly in nose engaging portions, upwardly behind the nose engaging portions and post, and a common transversely extending portion connecting said upwardly extending portions.

3. A center for an ophthalmic mounting, comprising a central arched member having its maximum width in a plane parallel to that of the lenses, said member terminating in depending portions, bearing members curving upwardly and inwardly from the lower portions of the depending portions, and posts carried by the upper portions of the bearing members and extending outwardly for engagement with the lens frames.

4. In a spectacle mounting, the combination with a pair of lenses and means located at the outer edges of the lenses for retaining the mounting in position on the face of the wearer, of an adjustable center for connecting the lenses, said center comprising a central forwardly curving bridge member terminating in downwardly and outwardly curving portions disposed behind the edge of the lens and out of engagement with the face of the wearer, said depending portions terminating in rearwardly and upwardly inclined widened bearing portions adapted for engagement with the sides of the nose of the wearer, the upper ends of said bearing portion being curved forwardly and outwardly around the depending portions of the bridge member, and having their outer ends connected to the lenses, substantially as and for the purpose described.

In testimony whereof I affix my signature in the presence of two witnesses.

GEORGE H. DAY.

Witnesses:
  EDITH M. HALVORSEN,
  JOSEPH J. DEMERY.